(12) United States Patent
Åhlander

(10) Patent No.: US 8,592,728 B2
(45) Date of Patent: Nov. 26, 2013

(54) FOOD COOKING DEVICE AND COOKING UTENSIL ADAPTED TO FACILITATE THE HEATING OF FOOD

(76) Inventor: Hans-Göran Åhlander, Eskilstuna (SE)

(*) Notice: Subject to any disclaimer, the term of this patent is extended or adjusted under 35 U.S.C. 154(b) by 1286 days.

(21) Appl. No.: 12/083,923

(22) PCT Filed: Oct. 12, 2006

(86) PCT No.: PCT/SE2006/050398
§ 371 (c)(1),
(2), (4) Date: Mar. 20, 2009

(87) PCT Pub. No.: WO2007/046762
PCT Pub. Date: Apr. 26, 2007

(65) Prior Publication Data
US 2009/0212038 A1    Aug. 27, 2009

(30) Foreign Application Priority Data
Oct. 21, 2005  (SE) .......................... 0502336

(51) Int. Cl.
| | |
|---|---|
| *H05B 1/02* | (2006.01) |
| *A47J 27/00* | (2006.01) |
| *G01K 1/08* | (2006.01) |
| *G01K 1/14* | (2006.01) |
| *G01K 1/16* | (2006.01) |

(52) U.S. Cl.
USPC ........... 219/429; 219/433; 219/441; 219/516; 99/331

(58) Field of Classification Search
None
See application file for complete search history.

(56) References Cited

U.S. PATENT DOCUMENTS

| | | | | |
|---|---|---|---|---|
| 3,715,550 | A * | 2/1973 | Harnden et al. | 219/622 |
| 3,719,789 | A * | 3/1973 | Harnden, Jr. | 219/627 |
| 3,742,175 | A * | 6/1973 | Harnden, Jr. | 219/627 |
| 3,742,178 | A * | 6/1973 | Harnden, Jr. | 219/627 |
| 3,742,179 | A * | 6/1973 | Harnden, Jr. | 219/627 |
| 3,781,504 | A * | 12/1973 | Harnden, Jr. | 219/622 |
| 3,786,220 | A * | 1/1974 | Harnden, Jr | 219/622 |
| 3,887,781 | A * | 6/1975 | Peters, Jr. | 219/627 |
| 3,953,783 | A * | 4/1976 | Peters, Jr. | 363/124 |
| 4,093,841 | A * | 6/1978 | Dills | 219/712 |
| 4,120,981 | A * | 10/1978 | Burkhart | 426/231 |

(Continued)

FOREIGN PATENT DOCUMENTS

| | | |
|---|---|---|
| DE | 19948472 A1 | 4/2001 |
| EP | 0779051 A1 | 11/1996 |

(Continued)

OTHER PUBLICATIONS

DE19948472 Al, Dorfschmidt, Apr. 19, 2001, partial translation.*

(Continued)

*Primary Examiner* — Joseph M Pelham
(74) *Attorney, Agent, or Firm* — Venable LLP; Eric J. Franklin

(57) ABSTRACT

A food-cooking device including at least one heating member arranged to heat food placed inside a cooking utensil. At least one sensor arrangement is arranged to sense the temperature of the cooking utensil. The food-cooking device is adapted to control the heating member based on the temperature sensed by the sensor arrangement. A cooking utensil is adapted to facilitate the heating of food with a food-cooking device. The cooking utensil includes a body designed with a hollow adapted to contain the food.

21 Claims, 1 Drawing Sheet

(56) References Cited

U.S. PATENT DOCUMENTS

| | | | |
|---|---|---|---|
| 4,377,733 A * | 3/1983 | Yamaguchi et al. | 219/713 |
| 4,455,480 A * | 6/1984 | Matsumoto et al. | 219/497 |
| 4,518,839 A * | 5/1985 | Taguchi et al. | 219/713 |
| 4,614,441 A | 9/1986 | Wolf | |
| 4,617,441 A * | 10/1986 | Koide et al. | 219/627 |
| 4,776,265 A * | 10/1988 | Ojima | 99/348 |
| 5,441,344 A * | 8/1995 | Cook, III | 374/141 |
| 5,746,114 A * | 5/1998 | Harris | 99/331 |
| 6,075,463 A | 6/2000 | Wauer | |
| 6,580,058 B2 * | 6/2003 | Gratz et al. | 219/448.11 |
| 7,202,454 B2 * | 4/2007 | Wiedemann et al. | 219/702 |
| 7,875,836 B2 * | 1/2011 | Imura et al. | 219/627 |
| 8,124,917 B2 * | 2/2012 | Friel et al. | 219/439 |
| 8,188,409 B2 * | 5/2012 | Baier | 219/413 |
| 2002/0130190 A1 | 9/2002 | Marbach et al. | |
| 2003/0042246 A1 * | 3/2003 | Gratz et al. | 219/448.14 |
| 2004/0163548 A1 * | 8/2004 | Pacenti | 99/403 |
| 2004/0226454 A1 * | 11/2004 | Pirkle et al. | 99/331 |
| 2005/0034611 A1 * | 2/2005 | McLemore | 99/413 |
| 2006/0254432 A1 * | 11/2006 | McLemore | 99/448 |
| 2007/0080158 A1 * | 4/2007 | Takimoto | 219/627 |
| 2009/0272730 A1 * | 11/2009 | Friel et al. | 219/439 |

FOREIGN PATENT DOCUMENTS

| | | |
|---|---|---|
| EP | 0802374 A1 | 10/1997 |
| EP | 0883327 A2 | 12/1998 |
| JP | 11262446 A * | 9/1999 |
| NL | 1022942 C2 | 9/2004 |

OTHER PUBLICATIONS

International Search Report, dated Jan. 11, 2007, issued in connection with counterpart International Application No. PCT/SE2006/050398.

* cited by examiner

FOOD COOKING DEVICE AND COOKING UTENSIL ADAPTED TO FACILITATE THE HEATING OF FOOD

CROSS-REFERENCE TO RELATED APPLICATIONS

This application claims priority to Swedish patent application 0502336-1 filed 21 Oct. 2005.

TECHNICAL FIELD

The present invention relates to a food-cooking device comprising at least one heating member arranged to heat food placed in a cooking utensil. The food-cooking device further comprises at least one sensor arrangement arranged to sense the temperature of an element of the cooking utensil, wherein the food cooking device is adapted to control the heating member based on the temperature sensed by the sensor arrangement. The invention also relates to a cooking utensil.

PRIOR ART

When cooking food it is sometimes desirable to heat the food to a high temperature in order to achieve various processes, such as Maillard reactions, a decrease in the presence of microorganisms, or changes in chemical structure, such as polymerization, gel formation etc. During the cooking some type of stove is generally used, comprising heatable hot plates, wherein a cooking utensil containing the food, for example a saucepan or a frying pan, is placed onto the hot plate.

One problem when cooking food is to keep the food at the right temperature for the right period of time. If the food is heated to a temperature, which is too low, it happens that the desired processes are not initiated, which for example may lead to that poisonous or infectious microbes survive the cooking. Correspondingly, if the food is heated to a temperature, which is too high, a desired process may proceed for too far, or an adverse process may be initiated, such as, for example, an excess Maillard reaction may lead to that the food becomes burnt and tastes bad. Another problem when cooking food is that a lot of energy is consumed during the cooking, which causes costs, both economically and environmentally.

A number of devices have been conceived in order to alleviate these problems. For example, patent document U.S. Pat. No. 5,397,873 shows a stove comprising a sensor sensing the temperature of a hot plate. By controlling the cooking of the food based on the temperature of the plate it is ensured that the temperature is not excessively high, which decreases the risk that the food is burnt. Furthermore the risk of accidents is decreased. For example, if a saucepan is cooked dry on an ordinary stove, the temperature may rise too such a degree that there is a risk of fire. The device senses the rising temperature and turns off the plate when reaching a limit temperature.

In document U.S. Pat. No. 5,746,114 an intelligent cooking system is shown comprising a stove and associated saucepans having identity markings. Both the stove and the saucepans are each provided with communication means for exchange of information. Each saucepan comprises a temperature sensor arranged inside the wall of each saucepan respectively, for sensing the temperature in the wall. The sensor comprises a thermoelement. Information about the temperature in the wall is transmitted to the stove through the communication means, wherein the stove controls the heating of the saucepan based on the temperature in the wall of the saucepan.

One problem with these devices is that the heat from the hot plate affects the measurement of the temperature to a large degree, and that knowledge of the temperature of the food in the saucepan hence remains relatively unknown. The temperature of the food may vary substantially depending on the quality and amount of the food for the same measured temperature in the hot plate or in the wall of the utensil. In document U.S. Pat. No. 5,746,114 it is said that the temperature in the wall of the saucepan is close to the temperature of the food since the measurement is taken place a distance away from the bottom of the saucepan. However, the heat conduction of the food is usually lower than the material of the saucepan, meaning that the sensor is more affected by the heat conducted through the saucepan. If the amount of food in the saucepan is small it also happens that the sensor is located above the food level and thus is not affected by the temperature of the food. If the sensor instead is located lower in order to avoid this problem the heat conduction from the bottom of the saucepan is increased with accompanied disturbance of the temperature. Hence the estimation of the temperature of the food is relatively poor and unsure.

SUMMARY OF THE INVENTION

According to a first aspect of the invention a cooking device is intended which allows an improved control of the cooking of a food. According to a second aspect of the invention a cooking utensil is intended which allows an improved control of the cooking of a food.

A sensor arrangement is designed to sense the temperature of an element of the cooking utensil, which element is arranged to be in contact with the food and which is arranged at a distance from the body of the cooking utensil, so that the element assumes a temperature close to the temperature of the food, a more accurate measurement of the temperature of the food is achieved. This in turn leads to a better control of the cooking. The food may thus be heated with a higher power during the initiation of the cooking, after which the power may be decreased to a level for temperature maintenance. Thus, the food is more quickly heated to a desired temperature, and is maintained more accurately at the desired temperature. This decreases the time for heating, which also decreases the energy consumption during the cooking. Furthermore, the energy consumption decreases further since the temperature of the food will not exceed the desired temperature. This also leads to that the risk of undesired processes decreases, such as that the food is burnt or for example the cause of a fire. Due to the good accuracy, sensitive foods, for example foods whose temperature may not exceed about 70°, and which previously have had to be heated in a water bath, may now be heated directly in the cooking utensil.

According to one embodiment the cooking utensil comprises a heat-insulating member arranged to attach the element to the body. Hence the element is attached to the cooking utensil in a good way without increasing the heat conduction to too detrimental levels. With advantage, said heat-insulating member comprises a metal having low heat conduction. A metal withstands large temperature variations and is therefore very durable. Furthermore, a metal withstands the high temperatures that the cooking utensil will be exposed to. Preferably the heat-insulating member comprises an air gap or gas gap. Since air and gas conducts heat badly the insulation increases if the member comprises such a gap. The heat conduction between the body and the element through the heat-insulating member may be calculated and thus the measurement of the temperature of the food and the element may be adjusted. In an alternative embodiment the heat-insulating member may be of wood, a polymer material or a ceramic, preferably a porous ceramic.

According to one embodiment the element comprises a surface arranged to emit thermal radiation in a direction towards the sensor arrangement of the food-cooking device, based on the temperature of the element, which sensor arrangement is arranged to sense the heat radiation from the element. Preferably the sensor arrangement is arranged to sense the temperature of the element by sensing the intensity of the heat radiation within at least one wavelength interval. Preferably, the sensor arrangement senses the radiation inside an interval in the infrared range. Thus, the sensor arrangement may easily measure the temperature of the element at a distance from the element, and the positioning of the sensor arrangement in relation to other parts of the cooking device and the cooking utensil also becomes more liberal. Furthermore the sensor arrangement may be positioned so that the heating member of the food-cooking device does not affect the sensor arrangement, which both increases the durability of the sensor arrangement, and increases the accuracy in the measurement. Preferably, the surface of the element has a color giving a high emittance of heat-radiation, which decreases measurement errors and increases the accuracy. Preferably, the surface of the element has a coefficient of heat-radiation emittance, which is larger than or equal to 0.5, which increases the accuracy and decreases the effects from disturbances when measuring the temperature.

According to a further embodiment the cooking device comprises at least one placement surface adapted for placement of the cooking utensil onto the placement surface, wherein the heating member is adapted to transfer energy to the cooking utensil through at least a first surface section of the placement surface. Preferably the cooking device is a stove and the cooking utensil is adapted to be used on a stove. Preferably, the placement surface is a part of a hot plate or hob. Hence it is possible to improve the control of the food cooking, based on the temperature of the food during the cooking of the food on the stove. Hence the invention will also be accessible to ordinary households. Normally it is otherwise difficult to measure the temperature of a food during food cooking on a stove, since the stove heats the food by heat conduction through the cooking utensil that therefore will be heated.

According to a further embodiment said element is arranged in connection with the bottom of the cooking utensil and the sensor arrangement is adapted to sense the temperature of an element arranged in connection with the bottom of the cooking utensil. Preferably, the element is designed to be a part of the bottom of the cooking utensil. Hence the element will be in contact with the food regardless of the amount of food inside the cooking utensil. Preferably, the heating member and the placement surface are hence designed to avoid transferring energy to the cooking utensil through at least a second surface section of the placement surface, which is designed so that the element is positioned in connection with the second surface section when the cooking utensil is placed onto the placement surface. Hence the heating member does not heat the element, even though the element is arranged in connection with the placement surface, allowing a more accurate measurement of the temperature of the food.

According to a further embodiment the second surface section comprises a portion adapted to allow passage of the heat radiation from the element of the cooking utensil to the sensor arrangement. Thus the sensor arrangement may easily be arranged on a distance from the heating member in the stove, which allows a longer lifetime of the sensor arrangement. Preferably the portion comprises a material, which is transparent in the wavelength range, in which the sensor arrangement measures.

According to a further embodiment the cooking device comprises a heat insulating material arranged in connection with the second surface section. Preferably the heat insulating material is arranged between the element and the first surface section when the cooking utensil is placed onto the placement surface. Hence the transfer of thermal energy from the first surface section to the element of the cooking utensil is decreased, which increases the accuracy.

According to a further embodiment the cooking device comprises a heat insulation arranged along the periphery of the placement surface. Preferably the cooking utensil also comprises a heat-insulating casing arranged around at least the main part of the outside of the body. Preferably the heat insulation and the heat-insulating casing are arranged to bear against each other so that they cooperatively insulates the cooking utensil and the placement surface. Hence the energy loss from the cooking utensil and the cooking device to the surroundings is decreased, so that the energy consumption during cooking decreases.

According to one embodiment the cooking device comprises an entering member arranged to receive an instruction about a desired temperature, and the cooking device is designed to heat the food to, and to keep the food at, the entered temperature. Preferably the cooking device is designed to control the heating member based on the rate of change of the temperature for the element.

According to one embodiment the entering member is arranged to also receive an instruction of a desired cooking time, and the cooking device is designed to control the heating with respect of the cooking time. Preferably the cooking device is also designed to heat the food for the entered time, and to terminate the heating after the entered time. Preferably, the heating is also completely controlled by a computer program. Hence the user does not need to monitor the utensil during the cooking but the cooking device completely and automatically controls the cooking of the food, which saves time for the user. Preferably the cooking device is designed to control the heating with respect to heat accumulated during the heating of the cooking device. The cooking device hence shuts down the heating member before the food has finished, after which the food is heated by the accumulated heat. Hence energy is saved, since less energy is wasted.

Preferably the cooking device is adapted to sense a cooking point of the food based on a decrease of the rate of change of the temperature of the element.

SHORT DESCRIPTION OF THE DRAWINGS

The invention is now to be described as a non-limiting example of the invention, and with reference to the attached drawings.

FIG. 1b shows a top view of a placement surface of the cooking device in FIG. 1a.

DETAILED DESCRIPTION

Figure 1A:
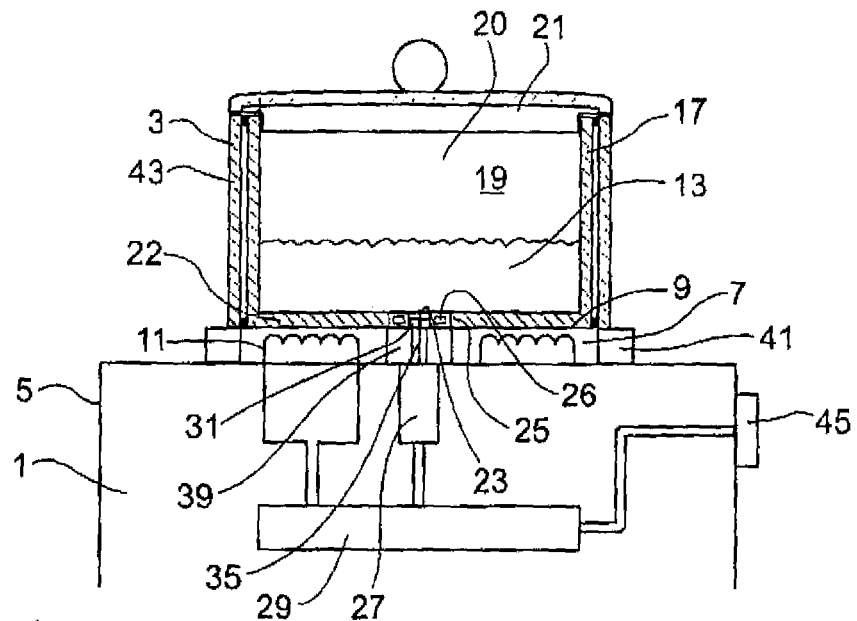
FIG. 1a shows one embodiment of a cooking device and a cooking utensil according to the invention in cross section.
Figure 1B:
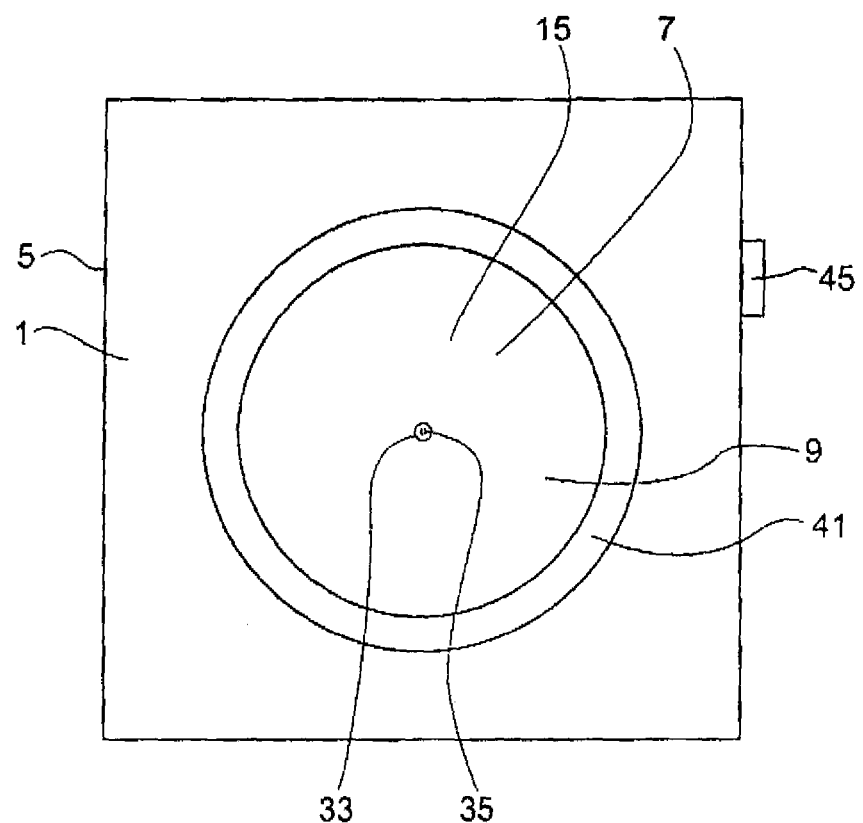

In FIG. 1a a food-cooking device 1 and a cooking utensil 3 are shown in cross section and in FIG. 1b the food-cooking device 1 is shown in a view from above. The cooking device 1 is in this example a stove and comprises a housing 5 arranged to surround the cooking device 1 as protection, a hot plate 7 comprising a placement surface 9 and a heating member 11 arranged in the hot plate 7 and underneath the placement surface 9. The hot plate 7 is manufactured in a metal material, alternatively a ceramic material, arranged to surround the heating member 11. The cooking utensil 3 is in this example a saucepan and comprises a body 17 shaped with a hollow 19 adapted to contain a food 13, which is to be cooked. The body 17 is shaped with an opening 20 and the cooking utensil 3 comprises a lid 21 arranged to cover the opening 20.

The placement surface 9 is adapted for placement of the cooking utensil 3 onto the placement surface 9. The cooking utensil 3 is thus placed against the placement surface 9 with its bottom 20. The heating member 11 is arranged to heat the food 13 inside the cooking utensil 3. Thus, the heating member 11 transfers energy to the cooking utensil 3 through at least a first surface section 15 of the placement surface 9. In this example the placement surface 9 is circular and the first surface section 15 is shaped as a ring extending round the placement surface 9.

The cooking utensil comprises an element 23 arranged to be in heat-transfer contact with the food 13 inside the inner hollow 19. The element 23 is further arranged at a distance from the body 17 of the cooking utensil 3, so that the element 23 assumes a temperature close to the temperature of the food. The cooking utensil 3 further comprises a heat-insulating member 25 arranged to attach the element 23 to the body 17. In this example the element 23 is a plate arranged in the middle of the bottom 22 of the saucepan. The heat-insulating member 25 is in turn designed as a plate arranged to encircle the element 23. In this example the element is circular and the heat-insulating member 25 is arranged in a ring around the element 23. In this example the heat-insulating member 25 comprises a metal material having a coefficient of thermal expansion, which is close to the coefficient of thermal expansion for the other material in the bottom 22. Further, the heat-insulating member 25 is designed so that the member 25 has low thermal conductivity. In this example the heat-insulating member 25 is manufactured of a metal material with a low thermal conductivity and the heat-insulating member comprises a hollow space 26 filled with a vacuum, or at least at low pressure, in order to further decrease the thermal conductivity. The heat-insulating member may in another example also comprise a ceramic, for example a porous ceramic, a heat resistant plastic, or a mixture of the materials above.

The food-cooking device 1 comprises a sensor arrangement 27 designed to sense the temperature of the element 23 of the cooking utensil 3. In that the sensor arrangement 27 is designed to sense the temperature of the element 23, which is designed so that it obtains a temperature close to the temperature of the food 13, the sensor arrangement 27 senses the temperature of the food 13 with good accuracy. The food-cooking device 1 further comprises a control member 29 arranged to control the heating member 11, and the cooking of the food 13 based on the current, sensed temperature of the element 23. The sensor arrangement 27 is thus arranged to send signals to the control member 29 relating to the sensed temperature of the food 13.

In this example the element 23 is arranged in the bottom of the cooking utensil 23. The top side of the element 23 is thus in contact with the food 13 regardless of the amount of food in the utensil 3. The underside of the element 23 in turn comprises a surface 31 arranged to emit thermal radiation based on the temperature of the element 23, and in a direction towards the sensor arrangement 27. The surface 31 of the element 23 is in this example coated with a coating emitting a high thermal radiation. Hence the uncertainty when measuring the temperature is decreased. The surface 31 of the element 23 has in this example a coefficient of thermal radiation, which is larger than or equal to 0.5, in this example the coefficient of thermal radiation is larger than or equal to 0.8. The sensor arrangement 27 is arranged to sense the thermal radiation from the surface 31. The sensor arrangement 27 thus senses the temperature of the element 23 by sensing the intensity of the heat radiation from the surface 31 in at least one wavelength interval. In this example the sensor arrangement 27 is designed to sense the thermal radiation within a wavelength interval inside the IR-range. The sensor arrangement 27 may thus be located on a distance from the element 23 and the utensil 3. In this example the sensor arrangement is contained a distance below the hot plate 7 and the placement surface 9.

The heating member 11 and the placement surface 9 are designed to avoid transferring energy to the cooking utensil 3 through at least a second surface section 33. The second surface section 33 is designed so that the element 23 is positioned in connection with the second surface section 33 when the cooking utensil 3 is placed onto the placement surface 9. In this example the second surface section 33 is shaped as a circular area in the middle of the placement surface 9. Since the element 23 in a corresponding way is arranged in the middle of the bottom 22 of the utensil, the element thus ends up right above the second surface section 33 when the utensil 3 is placed onto the placement surface 9. It is advantageous that the element 23 and the second surface section 33, respectively, are arranged in the middle, since the element 23 ends up above the second surface section 23 irrespective of how the utensil 3 is rotated onto the placement surface 9. In this example both the element 23 and the second surface section has a diameter which is larger than 1 cm. Hence the cooking utensil 3 does not need to be placed directly in the middle of the placement surface 9, but may be placed somewhat displaced without deteriorating the function with temperature sensing.

The second surface section 33 further comprises a portion 35 adapted to allow passage of heat radiation from the element 23 to the sensor arrangement 27. In this example the food-cooking device 1 comprises a heat-insulating material 39 arranged in connection with the second surface section 33. Hence the transfer of thermal energy from the heating member 11 to the element 23 is decreased, which lets the element 23 assume a temperature closer to the temperature of the food 13.

The cooking device 1 further comprises a heat-insulation 41 arranged along the periphery of the placement surface 9. Furthermore, the cooking utensil 3 is provided with a heat-insulating casing 43 arranged around at least the main part of the outside of the body 17. In this example the casing 43 is arranged around the entire outside of the body 17. Furthermore, the heat insulation 41 and the heat insulating casing 43 are adapted so that they bear against each other. Hence the heat insulation 41 and the heat insulating casing 43 form a completely covering insulation around the hot plate 7 and the cooking utensil 3, which decreases the heat loss during cooking of the food.

The food-cooking device 1 further comprises an entering member 45 adapted to allow a user to specify a desired temperature, The control member 29 is arranged to receive signals of a desired temperature from the entering member 45 and to control the heating member 11, and thus the heating of the food 13, based on the received desired temperature and the temperature of the food 13 as sensed by the sensor arrangement 27. The entering member 45 is further adapted to allow a user to specify a desired time for the heating, wherein the control member 29 controls the heating member 11 based on the time entered. The control member 29 is thus arranged to control the heating member 11 to heat the food to a desired temperature and to keep the food at the entered temperature during the entered time.

In the beginning of the cooking the temperature of the food 13, and thus the element 23, is low, while the desired temperature is high. The control member 29 is thus adapted to control the heating member 11 to generate a large power in order to quickly heat the food 13 to the desired temperature. Thus, a high rate of change of temperature for the food and element is achieved. The control member 29 is further adapted to control the heating member 11 to generate a lower power when the temperature of the food begins to close in on the desired temperature. Thus the risk that the temperature of the food 13 increases above the desired temperature is decreased. The control member 29 is also arranged to control the heating member 11 with respect of the thermal energy accumulated in the hot plate during the heating. The control member 29 thus controls the heating member 11 to generate a lower power.

The control member 29 is further adapted to control the heating member 11 based on the rate of temperature change of the element 23. The control member 29 is in this example arranged to control the heating member 11 by PID-control. Hence the risk that the temperature rises above the desired temperature is decreased further.

The control member 29 is further adapted to sense a boiling point of the food based on a flattening out of the rate of change of the temperature for the element. When the food 13 reaches its boiling point the rate of temperature change levels out and becomes close to 0, even though the heating member 11 generates a high power. In this way the control member 29 senses that the boiling point has been reached. This is advantageous since the boiling point may vary depending on the composition of the food and the surrounding pressure when the food is boiling. By identifying the boiling point in this way the control member 29 may more easily achieve an efficient cooking.

The invention is not limited to the embodiment described above but may be varied within the framework of the following claims.

For example the cooking device is not limited to one hot plate but may comprise several plates of different sizes and shape. Furthermore the cooking device may comprise a glass- or ceramic hob instead of hot plates, wherein the design of the placement surfaces are given by the design of the heating members. The food cooking device may also comprise one or more ovens or similar.

Furthermore the element does not need to be positioned in the middle of the bottom of the utensil but it may be arranged along the periphery of the bottom of the cooking utensil or in connection with a lower part of a wall of the cooking utensil. Furthermore the element may be arranged to protrude into the hollow, wherein the element protrudes from the hollow through an opening, either through a sealed opening in a wall or through a hole in the lid.

The positioning of the sensor arrangement may be varied depending on the design of the element. The sensor arrangement may be placed close to the plate or at a distance away from the plate in order to avoid that it is subjected to the heat from the heating member. The heat insulations mentioned may for example comprise a metal with low thermal conductivity, a ceramic, a glass fiber, a polymer or a mixture thereof.

The invention claimed is:

1. A food-cooking device, comprising:
    at least one heating member arranged to heat food placed inside a cooking utensil, wherein the at least one heating member is arranged adjacent a bottom of the cooking utensil;
    an element arranged at the bottom of the cooking utensil in heat transferring contact with the food, such that the element assumes a temperature close to the temperature of the food;
    a heat insulating member arranged at the bottom of the cooking utensil between a body of the cooking utensil and the element, the heat insulating member comprising at least one of ceramic or heat resistant plastic, wherein the heat insulating member is arranged to attach the element to the body; and
    at least one sensor arrangement arranged to sense a temperature of the cooking utensil, where in the at least one sensor is arranged to sense a temperature of the element, wherein the food cooking device is adapted to control the heating member based on the current, sensed temperature of the element.

2. The food-cooking device according to claim 1, wherein the sensor arrangement is arranged to sense the temperature by sensing a heat radiation emitted from the element.

3. The food-cooking device according to claim 2, wherein the sensor arrangement is arranged to sense the temperature of the element by sensing an intensity of the thermal radiation within at least one wavelength interval.

4. The food-cooking device according to claim 1, wherein the sensor arrangement is adapted to sense the temperature of the element arranged in connection with a bottom of the cooking utensil.

5. The food-cooking device according to claiml, further comprising:
    at least one placement surface adapted for placement of the cooking utensil onto the placement surface, wherein the heating member is designed to transfer energy to the cooking utensil through at least a first surface section of the placement surface.

6. The food-cooking device according to claim 5, wherein the heating member and the placement surface are designed to avoid transferring energy to the cooking utensil through at least a second surface section which is designed so that the element is positioned in connection with the second surface section when the cooking utensil is placed onto the placement surface.

7. The food-cooking device according to claim 6, wherein the second surface section comprises a portion adapted to allow passage of the heat radiation from the element of the cooking utensil to the sensor arrangement.

8. The food-cooking device according to claim 6, further comprising:
    a heat-insulating material arranged in connection with the second surface section.

9. The food-cooking device according to claim 5, further comprising:
    a heat insulation arranged along a periphery of the placement surface.

10. The food-cooking device according to claim 1, further comprising:
    an entering member arranged to receive an instruction on a desired temperature, wherein the food-cooking device is designed to heat the food to, and to keep the food at, the desired temperature.

11. The food-cooking device according to claim 10, wherein the food-cooking device is designed to control the heating member based on the rate of change of the temperature of the element.

12. The cooking utensil according to claim 1, wherein the heat insulating member comprises a porous ceramic.

13. The food-cooking device according to claim 1, wherein the heat insulating member surrounds the element.

14. The food-cooking device according to claim 1, wherein the heat insulating member comprises a porous ceramic.

15. A cooking utensil adapted to facilitate heating of a food with a food-cooking device, the cooking utensil comprising:
   a body comprising an inner hollow adapted to contain the food;
   an element arranged at the bottom of the cooking utensil to be in heat transferring contact with the food inside the inner hollow so that the element assumes a temperature close to the temperature of the food; and
   a heat insulating member arranged at the bottom of the cooking utensil between the body of the cooking utensil and the element, the heat insulating member comprising at least one of ceramic or heat resistant plastic, wherein the heat insulating member is arranged to attach the element to the body.

16. The cooking utensil according to claim 15, wherein the element comprises a surface arranged to emit thermal radiation based on the temperature of the element in a direction towards a sensor arrangement of the cooking device.

17. The cooking utensil according to claim 16, wherein the surface of the element has a coefficient of thermal radiation which is larger than or equal to 0.5.

18. The cooking utensil according to claim 15, wherein the heat insulating member comprises a metal having a low thermal conductivity.

19. The cooking utensil according to claim 15, wherein the cooking utensil is designed to be placed on a placement surface of the cooking device with a bottom, and wherein the element is arranged in connection with the bottom.

20. The cooking utensil according to claim 15, further comprising:
   a heat insulating casing arranged around at least the main part of the outside of the body.

21. The cooking utensil according to claim 15, wherein the heat insulating member surrounds the element.

* * * * *